(No Model.) 2 Sheets—Sheet 1.

J. F. MARTIN.
UNDERGROUND DISTRIBUTER FOR ELECTRIC WIRES.

No. 286,939. Patented Oct. 16, 1883.

Witnesses:
Frank J. Blanchard
Will R. ......

Inventor:
John F. Martin
By Jno. G. Elliott
Attorney.

(No Model.) 2 Sheets—Sheet 2.

J. F. MARTIN.
UNDERGROUND DISTRIBUTER FOR ELECTRIC WIRES.

No. 286,939. Patented Oct. 16, 1883.

Witnesses:
Frank J. Blanchard
Will R. Auchmuntra

Inventor:
John F. Martin
By Jno. G. Elliott
Attorney.

N. PETERS. Photo-Lithographer, Washington, D. C.

UNITED STATES PATENT OFFICE.

JOHN F. MARTIN, OF CHICAGO, ILLINOIS.

UNDERGROUND DISTRIBUTER FOR ELECTRIC WIRES.

SPECIFICATION forming part of Letters Patent No. 286,939, dated October 16, 1883.

Application filed March 12, 1883. (No model.)

*To all whom it may concern:*

Be it known that I, JOHN F. MARTIN, a citizen of the United States, residing in Chicago, county of Cook, and State of Illinois, have invented certain new and useful Improvements in Underground Distributers for Electric Wires, of which the following is a specification.

This invention relates to underground conduits for electric conducting-wires which are designed to be laid under the streets, sidewalks, or other available portions of a city, and in which traps or test-boxes are connected with the main conduit pipe sections and with branch pipes.

The object of my invention is to provide a cheap, simple, and efficient means for distributing and carrying off wires from the main conduit to buildings, or through cross-streets or alley-ways along the route, and also to permit ready access to be had to the wires at such distributing-points, and to further designate each wire by name or number, so that no confusion can possibly occur in either laying, taking up, or repairing the wires, or the means employed for insulating them. These objects I attain by the means illustrated in the annexed drawings, in which—

Figure 1:
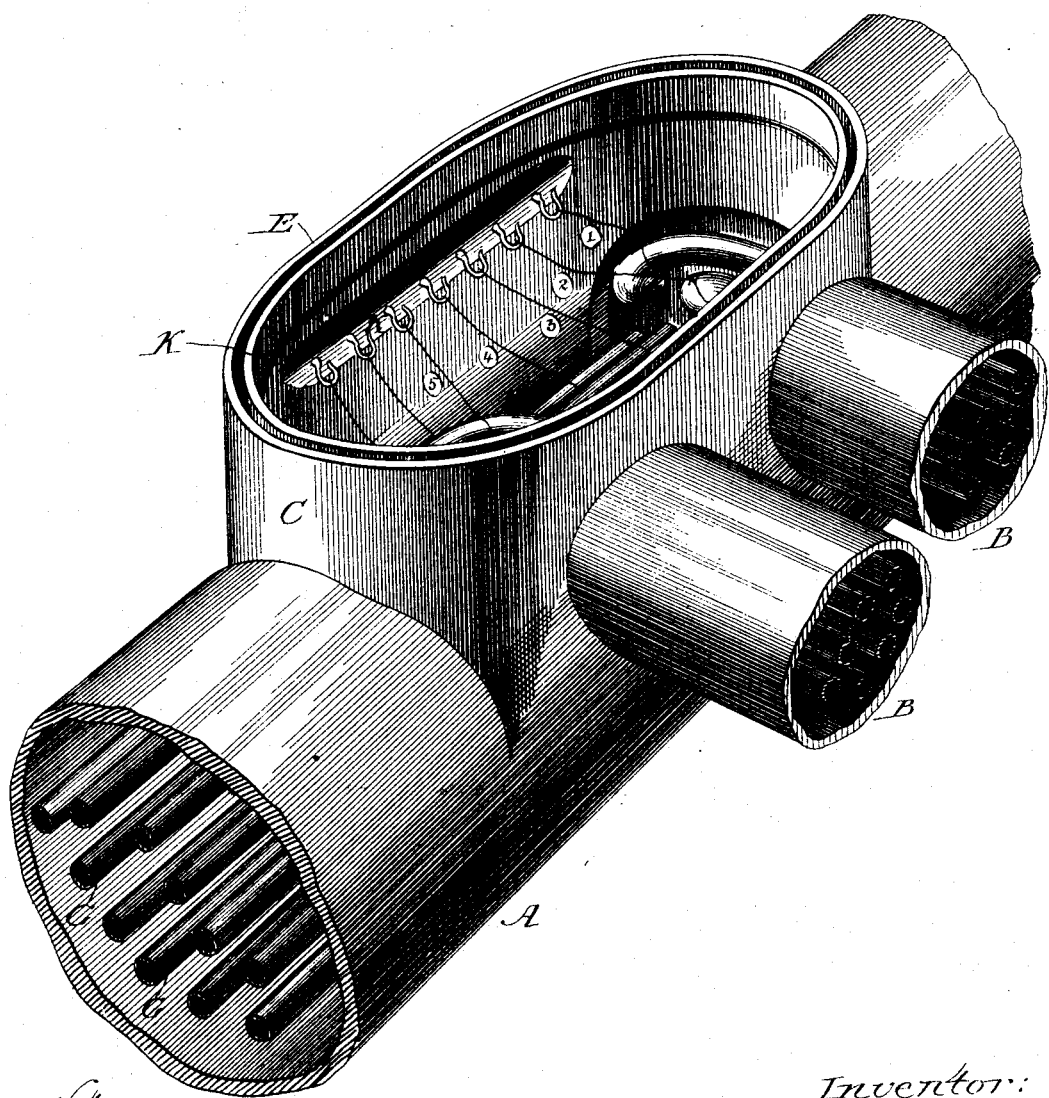
Figure 2:
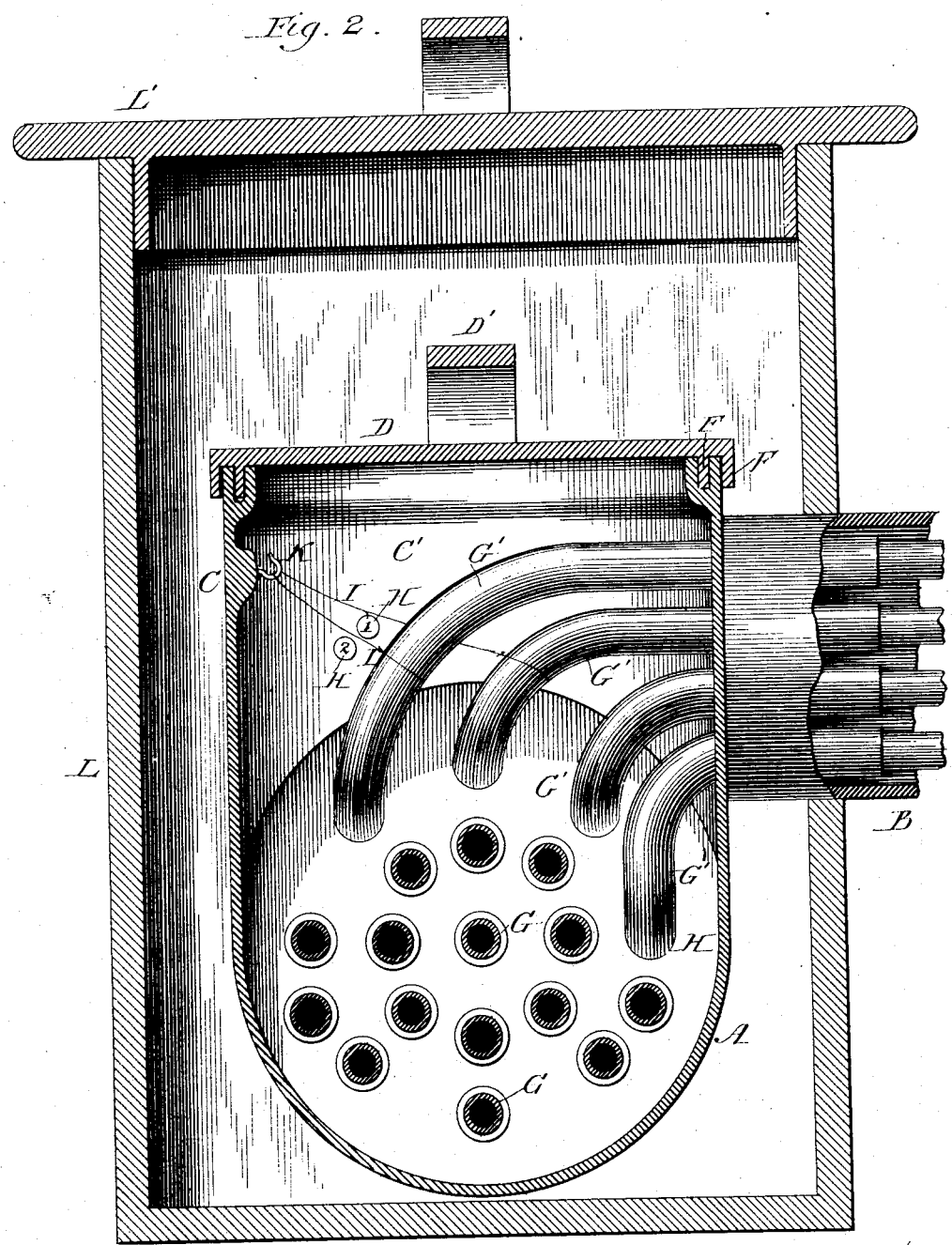

Figure 1 is a perspective view of a portion of a conduit-pipe constructed in accordance with my invention, the cover for the distributing-chamber being removed. Fig. 2 is a transverse section with the cover on, and the whole inclosed by an outer box or casing.

Let A indicate one of the pipe-sections of an underground conduit for electric conducting-wires. The pipe-sections of this conduit are composed of asphaltum or of terra-cotta, and are laid under the street or sidewalk or other desired locality in a city in which it is proposed to carry the wires through an underground conduit. At such points along the conduit as it may be desired to provide branch lines or to carry off any of the wires to houses along the route or adjacent thereto, I connect the pipe-section with one or more elbows or intersecting conduit pipe-sections, B, branching laterally from one or both sides of the conduit, and of sufficient capacity for inclosing as many of the wires as it may be desired to branch off from the main conduit. At each point in the main conduit where these branch pipes occur I provide means for permitting access to the interior of the main pipe, so that after the pipes have been laid any desired number of wires can be distributed or carried off from the main pipe through the branch pipes, or the wires taken out or inspected, as occasion may require. To such end I form a section of the conduit-pipe with an opening in its top or side, and surround said opening by a continuous wall, C, which stands out from at, or substantially at, right angles to the pipe, and constitutes the wall of an upper chamber communicating with the pipe.

As a cheap, simple, and convenient mode of forming the chamber C', I make the vertical walls thereof integral with the pipe-sections, whereby in manufacturing the pipe-sections for an underground conduit certain sections can be molded with these walls or enlargements, by means of which said chambers are formed. This chamber is closed at the top by a cover, D, having a handle, D', or other suitable appendage for allowing the cover to be removed, so that access can be had to the chamber and interior of the pipe. The cover should be tightly fitted over the chamber in order to exclude dirt and moisture, and for this purpose I provide a groove, E, in the top edge of the wall that surrounds the chamber, and form the cover with two pendent parallel or concentric flanges, F, one of which is adapted to fit in the said groove and the other to fit against the outer side of the wall. If necessary, a packing strip or strips could be employed for more effectually rendering the joint between the cover and the chamber-wall airtight, although the construction herein shown will, in practice, be found suitable for the purpose.

In laying the electric conducting-wires through the conduit and its branches, I propose adopting a method which is set forth in a separate application which I have made for Letters Patent of even date herewith. Under such method a number of insulating-tubes are arranged within the conduit, and at points where interruptions or breaks occur in the conduit I insulate the wires by passing them through insulating coupling-tubes, which extend across the break, and which are connected with the fixed insulating-tubes in the pipes by means of tubular couplings.

In the present instance, G indicates the insulating-tubes, which pass through the conduit-pipe, and are held apart, so as to prevent inductions, by means of disks H, fitted within the main pipe, and provided with perforations, in which the tubes are received. These disks, which can be made of wood, paper, or other suitable material, are located within the main pipe at opposite sides of its enlargement C, whereby the couplings or insulating-tubes designed to protect such wires as it may be desired to run into the branch pipe or pipes can be bent laterally and passed into the branch pipe, in which a perforated disk similar to the one herein shown can be arranged, so as to provide a support for the insulating-tubes. In order to admit of these lateral bends in the insulating material employed for those portions of the wires which are within the chamber C', I preferably form the connecting insulating-tubes G' of some suitable flexible material which can be readily bent in conformity to the bends in the wires. These flexible tubes can be coupled with the straight tubes which lie in the main conduit and in its branch pipes, whereby the wires shall not be exposed at any point along the line. The wires which are to be carried along the conduit past the branch pipes can be passed through the tubes that are supported by the perforated disks, and also through insulating-tubes, which extend from disk to disk in lines substantially coincident with the bore of the main pipe. These tubes, between the disks or supports, can also be coupled with the tubes in the main pipe by suitable means—such, for example, as by short tubes slipped over the joints.

In order to indicate each wire, I propose numbering them, so that when the cover for the chamber is taken off the connection or individual use of each wire can be ascertained. To this end I label each insulating-tube which passes into and past the branch pipes and number each tag or label. The tags or labels H are hung upon wires I, which are respectively attached to the several tubes and connected with hooks K or analogous devices secured to the inner wall of the chamber.

The conduit-pipe herein shown can be laid in the ground, so that the cover for its enlarged portion shall be flush with the surface of the ground; or, in lieu of this, I can lay the pipe somewhat deeper and box in its enlargement, as shown in Fig. 2, in which it will be seen that I provide a box or case, L, having a cover, L', by means of which the box can be opened, so as to permit access to the cover of the chamber C', which may be designated as the "distributing-chamber." Where this inclosing-box is provided it will be set in the ground, so that its cover shall be on a level with the surface of the ground, or below or above the same, as preferred.

The above cheap and simple means for carrying off wires from the main conduit will be found especially applicable to suburban districts, where the number of wires required is much less than in the more central portions of a city. This test or distributing box or casing can, however, be employed along the route at any portion of the city, and when desired it can be made at the side of the pipe instead of on top, and set next to the curbing or in any other position; also, a pipe or pipes could connect with its side or top and be arranged to extend up alongside of or into a building, which latter, for instance, is to be supplied with quite a number of wires.

Having thus described my invention, what I claim, and desire to secure by Letters Patent, is—

1. The straight conduit-pipe having an opening surrounded by a vertical wall forming a box, in combination with the branch pipes, the insulating-tubes, and flexible coupling-tubes, said box being provided with a suitable cover, substantially as described.

2. In an underground conduit for electric conductors, the pipe-section, the wall made perpendicular to the length of the pipe and formed around an opening through the top or side of the same, and the branch pipe or pipes leading from the chamber that is inclosed by the said wall, all molded in one piece, in combination with an inclosing-box, substantially as and for the purpose described.

3. The combination, with the conduit-pipe having an opening surrounded by a wall forming a contiguous box, of the insulating-tubes, the flexible couplings, and the suspended tags, all arranged substantially as described.

JOHN F. MARTIN.

Witnesses:
W. W. ELLIOTT,
JNO. G. ELLIOTT.